May 7, 1963   D. E. HUNT   3,088,709
POWER-OPERATED WINCH FOR BOAT TRAILERS AND THE LIKE
Filed Feb. 24, 1961   2 Sheets-Sheet 1
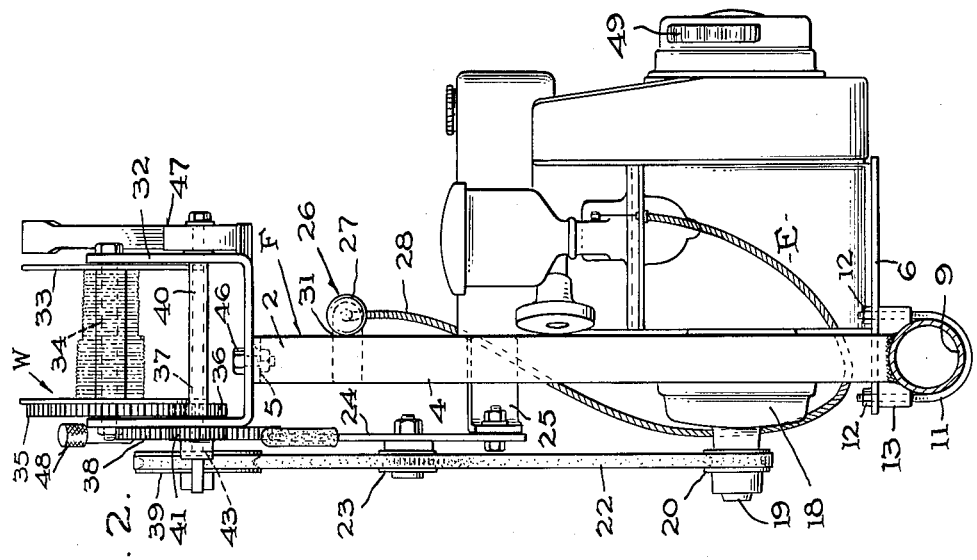
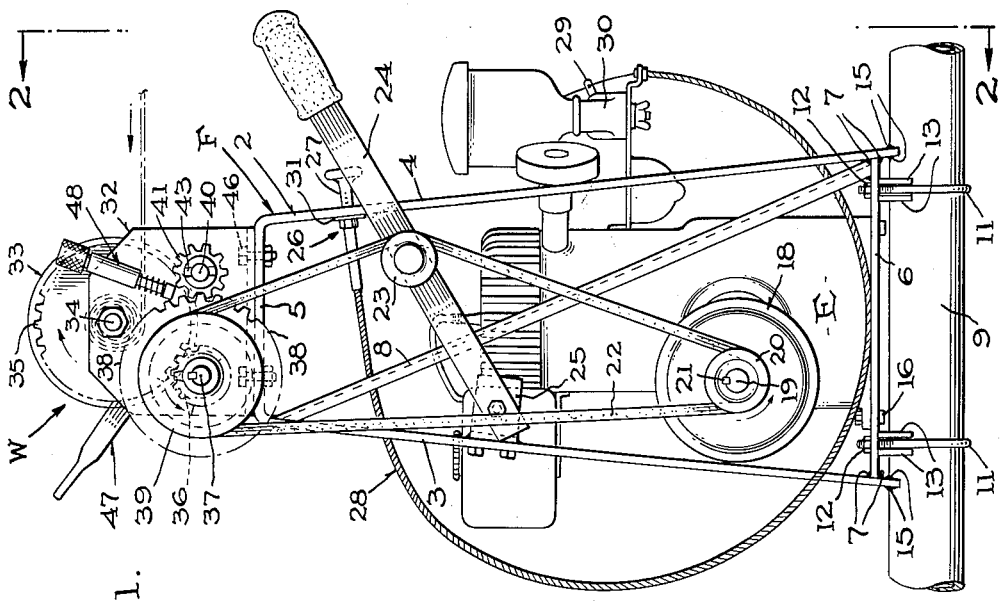
INVENTOR
DONALD E. HUNT
BY Robb & Robb
ATTORNEYS May 7, 1963 D. E. HUNT 3,088,709
POWER-OPERATED WINCH FOR BOAT TRAILERS AND THE LIKE
Filed Feb. 24, 1961 2 Sheets-Sheet 2
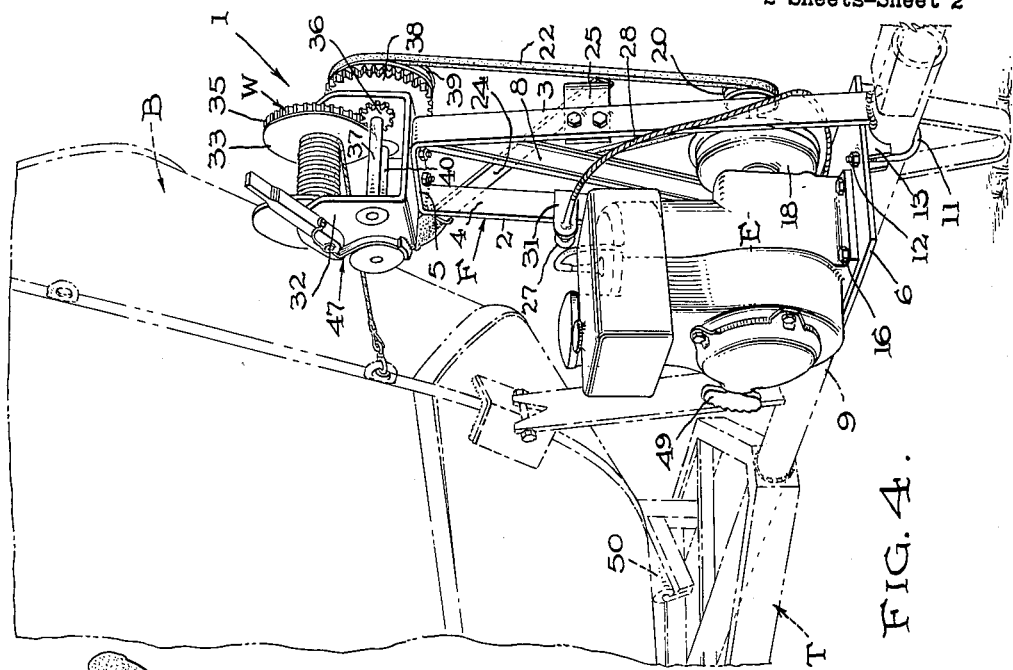
FIG. 4.
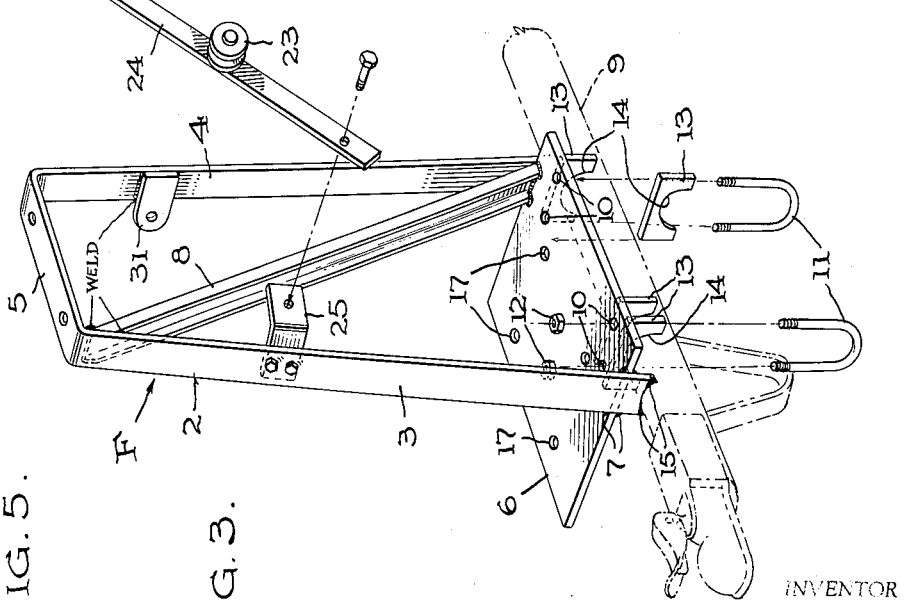
FIG. 3.
FIG. 5.
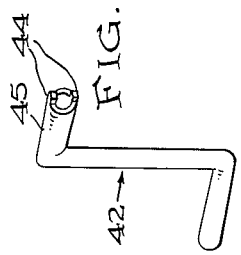
INVENTOR
DONALD E. HUNT
BY *Robert Robb*
ATTORNEYS

United States Patent Office 3,088,709
Patented May 7, 1963

3,088,709
POWER-OPERATED WINCH FOR BOAT TRAILERS
AND THE LIKE
Donald E. Hunt, Miami, Fla.
(285 Aragon Ave., Coral Gables, Fla.)
Filed Feb. 24, 1961, Ser. No. 91,387
1 Claim. (Cl. 254—166)

The present invention relates generally to winch devices for use in the loading and unloading of trailers or the like. More particularly, this invention appertains to a relatively small gasoline engine powered winch unit having a mounting frame adaptable for either permanent or temporary mounting upon the forward framework of boat trailers or the like, and by means of which a boat or other load may be readily drawn up onto the trailer and suitably secured thereto for transportation of the same over land.

In view of the increased popularity of relatively small and light-weight pleasure and fishing boats, which are adaptable for hauling on car-towed trailers to and from the bodies of water where they are to be used, suppliers of equipment for the boating enthusiasts continually strive to make their boating pleasures as easy and work-free as possible. Many kinds of boat trailers having various cable winding or winch means associated therewith have been proposed and/or marketed heretofore. Generally speaking, these are usually of the manually operable or hand-crank type. Furthermore, they generally require one person to do the cranking and usually other persons to aid in the guiding or aligning of the boat during the loading thereof onto the trailer bed and to maintain the aligned position of the boat with respect to the trailer during the relatively slow and tedious manual cranking operation.

Accordingly, it is one object of the present invention to provide an improved power-operated winch and mounting structure therefor adaptable for mounting on the forward end of boat trailers and the like to facilitate an expeditious and more efficient loading of a boat thereon.

Another object of the invention is to provide an improved self-contained power-operated winch unit which can be quickly and easily mounted or installed upon the tongue or draw-bar of boat trailers or the like.

A further object of the invention is to provide an improved boat loading and unloading device of the aforesaid type which is compact and simple in form, and which simplifies one-man loading or unloading operations.

Other objects and advantages will become more apparent from the following detailed description, taken in conjunction with the accompanying drawings, and the novel features thereof will be defined in the appended claims.

In the drawings:

FIG. 1 is a side elevational view illustrative of my power-operated winch unit as shown attached to a boat trailer tongue or draw-bar of which only a fragmentary portion is shown;

FIG. 2 is a rear end elevational view as seen on the line 2—2 of FIG. 1;

FIG. 3 is a partially exploded perspective view of the supporting frame of the winch assembly;

FIG. 4 is a perspective view as seen from the front end of the assembly of FIGS. 1 and 2, showing the application thereof to a boat and tow-trailer, with the boat and trailer being shown in fragmentary broken outline; and FIG. 5 is a perspective view of an auxiliary hand crank for the winch unit.

Like reference characters designate corresponding parts throughout the several figures of the drawings, wherein 1 generally designates the power driven winch assembly, which may be installed either permanently or removably at the front end of a trailer or other suitable load-transporting vehicle. The upright mounting frame portion of assembly 1, in turn, is generally designated F, with the winch mechanism mounted thereon being designated W, and both will be described in detail in the following.

The mounting frame F preferably comprises an inverted generally U-shaped metal body member 2, with the legs thereof, 3 and 4 respectively, slightly diverging away from the upper connecting arm 5 of the U member. The arm 5 forms the top of the frame F, while the opposite and free ends of the legs 3 and 4 are suitably secured to a laterally extended bed or base plate 6, as by welding at 7, thus forming a shallow open box-like structure. A suitable diagonal cross-brace 8 is also secured as by welding internally of the member 2, with one end of the brace 8 secured both to the lower end of leg 4 and to the plate 6, while the other end of the brace is welded to the other leg 3 adjacent its juncture with arm 5 at the top of the frame F. The brace 8, as illustrated, is preferably a metal channel member, but may be of any other suitable shape as will remain rigid when subjected to the relatively heavy compressive loads imposed thereon during loading and unloading of the boat with the aid of the winch unit. The brace 8 is therefore so disposed that it inclines forwardly and upwardly from the trailer tongue or draw bar. In this manner, the frame F resists being distorted under the stress induced by heavy loads being drawn by the winch W. To withstand the stress of heavier boats or loads exceeding, for example, those in the 3,000 lb. class, it is contemplated that the strength of the frame F can be made also of heavier stock material and/or of other than flat bar stock. Additionally, in these instances, use of a winch having suitably increased torque capacity would be in order.

Where the frame F is to be mounted upon a round tongue member 9 of a trailer T, the base plate 6 is preferably provided with two pairs of aligned U-bolt mounting holes 10, 10 (see FIG. 3) to receive the threaded ends of U-bolts 11, 11, which are retained in place by nuts 12, 12. Additionally for this type of mounting, the under side of base plate 6 may be provided with pairs of mounting shoe brackets 13, 13 fixed thereto as by welding adjacent each side of the aligned holes 10, 10, said brackets 13, 13 being arcuately cut out at 14 to complementally seat on the rounded trailer tongue 9. In the case of a temporary or removable mounting of the frame F upon the tongue 9, the unit preferably is not additionally welded, although in the case of rounded tongues such as 9, tack welds 15, 15 (FIGS. 1 and 3) may be desirable to further stabilize the mounting. Where the trailer tongue is of a channel or box type structure, it may be desirable to eliminate the use of complementally shaped brackets 13 and to secure the lower ends of legs 3 and 4 flush with base plate 6, and, in turn, seat plate 6 directly onto the flat or squared mounting surface of this latter type tongue structure. Where a quickly removable installation is desired, the U-bolts can be complementally squared to secure a more positive and stable mounting thereof and in this latter form no supplementary tack welding need be utilized. For permanent installations, in lieu of or in addition to the bolted down construction, suitable bead, spot or other appropriate welds may be used to attach the frame F to the trailer vehicle.

The bed or base plate 6 of the frame F additionally serves as a mounting support for a suitable power operating means for the winch, and as illustrated, said power means preferably has the form of a standard two or four cycle internal combustion engine designated E. The engine E is initially secured to the plate 6 as by a plurality of bolt-and-nut assemblies 16, with the bolts passing through holes 17 in the plate 6. Engine E is preferably provided with a built-in reduction gear transmission 18 having a power take-off shaft 19 extending therefrom. A suitable power transmitting element such as a driving pulley 20 is secured to shaft 19 as by key 21, said pulley having a friction drive belt 22 passing therearound and up over a driven pulley 39 on the winch W to be described in more detail, and also over an intermediate idler pulley 23, which is freely rotatably mounted on a clutch throw-out arm or lever 24. Arm 24 is pivotally attached to an angular bracket 25 fixed to one of the legs of the frame F as by welding or bolting. The engine E is further provided with a throttle control means 26 which includes a control knob 27 attached by means of a conventional Bowden-type cable 28 leading to a control arm 29 on the carburetor 30. The control means is supported on the frame F by means of an apertured bracket 31 fixed to leg 4 thereof.

The winch mechanism W is adapted for removable mounting upon arm 5 of frame F by any suitable means such as bolt-and-nut assemblies 46, the bolts passing through aligned holes in the bottom of winch frame 32 and the top or arm 5 of the frame F. The winch may be of any appropriate conventional type but preferably is one having a suitable gear ratio to accommodate anticipated or desired work load requirements. The illustrated winch per se includes a pair of reduction gears mounted respectively on a pair of parallel shafts 34 and 37, said shafts being suitably journaled in the upright sides of a U-shaped winch frame 32. A cable winding reel or drum 33 is rotatably carried on the uppermost shaft 34 and has fixed thereto adjacent one end a gear 35 which is driven by a smaller aligned intermeshing spur gear 36 mounted for rotation with the drive shaft 37 which is belt driven in the following manner. One end of shaft 37 extends beyond the frame 32 sufficiently for mounting thereon and for rotation therewith a larger spur gear 38 and a drive pulley 39 to receive the aforementioned drive belt 22. The speed reduction ratio of the illustrative gears 36 and 35 is approximately 3½:1 when driven by the pulley 39 as mounted on the drive shaft 37.

A separate brake shaft 40 is also journaled in the upright sides of the winch frame 32 parallel to shafts 34 and 37, and is disposed substantially in the same horizontal plane as shaft 37. One end of shaft 40 also extends beyond the frame 32 in the same general manner as does shaft 37. A spur gear 41, preferably, but not necessarily, having the same general size and specifications as the gear 36, is fixed for rotation with shaft 40 outwardly adjacent the frame 32 and in intermeshing alignment with the gear 38 on shaft 37. Accordingly, the use of gears 38 and 41 effects only a means of interconnecting the brake shaft 40 with the drive shaft 37, and said gears, 38 and 40, do not form a part of the winch reduction gear train. A conventional band-type braking means designated generally at 47 (better seen in FIGS 2 and 4) is disposed outwardly of frame 32 opposite from the gears. Also carried by the frame 32, and on the same side with the gears, is a suitable spring-loaded locking means or ratchet 48 adaptable to automatically prevent retrograde rotation of the drive during use of the winch W, said locking means being retractible to an inoperative position when its use is not desired or required.

In the case of engine failure or when otherwise desired, manual turning of the reel 33 may be achieved by the application of a hand-crank 42, shown in FIG. 5, to the end of shaft 40. For this latter purpose, the hub of gear 41 is preferably provided with a slot 34, better seen in FIG. 1, to receive the complemental lugs 44 projecting from the tubular shank 45 of crank 42. Other similar means (not shown) may be provided to permit direct manual crank rotation of shaft 37 where desired.

An operational summary of my invention will now be described.

In view of the foregoing detailed description, it is apparent that the power-operated winch mechanism W, when attached to the frame F, is adaptable for either permanent or temporary mounting upon the tongue or other forward framework of the boat trailer T, thus assuring general alignment of the winding reel 33 with the center of the trailer. The engine E is normally used as the source of power to operate the winch W, said engine E having a manual pull-cord type of starter denoted generally at 49 (FIGS. 2 and 4). During the starting of the engine E, the clutch throw-out arm or lever 24 is pivoted upwardly to release the tension of the idler pulley 23 against the drive belt 22, allowing the belt to slip. The throttle member 27 is used to regulate engine speed after it has been started. As illustrated in FIG. 1, with the engine running and the power take-off shaft 19 and pulley 18 rotating in a counter-clockwise direction, when the drive belt 22 is tensioned by the idler pulley 23 and lever 24, the pulley 39, winch shaft 37, and gear 36 are driven also in a counter-clockwise direction, thus imparting an opposite and clockwise rotation to the cable winding reel 33 by way of the gear 35 which is secured to one end of the reel 33.

It is further apparent that the operator can stand between the rearward side of the winch and the front of the trailer bed to better enable him to both coordinately operate the controls 24, 27 and 47 and to help keep the boat properly aligned during either loading or unloading from the trailer. The trailer T preferably is provided with the usual anti-friction rollers 50 (FIG. 4) and/or a smooth skid rail for the keel to glide upon, as well as to also help guide the boat during either loading or unloading operations.

Adequate loading torque is assured in my improved winch in a threefold way. The first is by utilizing a reduction gear transmission between the engine crankshaft and the power take-off shaft 19, with a gear ratio such as 6:1, 4:1 or any other ratio desired. A second speed reduction is achieved by the use of a friction belt drive and pulleys having a driving pulley 20 to driven pulley 39 exemplary ratio of 2:1, although other ratios are also readily attainable by substituting pulleys of different sizes. The third way is by use of a winch having an appropriate gear ratio which may vary according to the winch selected for a given use or range of normal conditions.

While specific details of an illustrative embodiment of my invention have been shown and described, it is to be understood that other changes and alterations may be made without departing from the spirit thereof as defined in the appended claim.

I claim:

A portable power-operated winch unit for boat trailers and the like, comprising a generally upright supporting frame adapted to be secured to the tongue or draw-bar of the trailer adjacent to the forward end thereof, a bed-plate secured to the lower end of the frame and extended laterally beyond one side thereof, an internal combustion engine mounted on said bed-plate at one side of said frame, a cable winding drum rotatably mounted at the top of said frame, and power transmission means operatively interconnecting said engine with said drum, said supporting frame being of a generally inverted U-form and having an arm connecting the legs of the U and disposed substantially horizontally at the top of the frame upon which the cable winding drum is mounted, the legs of the U-frame diverging slightly from top to bottom and being rigidly connected at their lower ends to said bed-plate, a brace disposed diagonally between the top of the frame and the bed-plate, said brace having one end thereof inclined upwardly and forwardly away from the boat trailer to reinforce the frame against stress imposed on the frame by the cable winding drum when the latter is subjected to load, said power transmission means including co-planar driving and driven pulleys operatively connected to the engine and the cable winding drum respectively, a friction drive belt normally loosely embracing both pulleys, a bracket anchored to one side of the frame and extending therefrom toward the opposite side thereof, a clutch arm disposed between said pulleys and pivotally connected at one end to the bracket, with the free end of said arm extending toward and beyond the opposite side of the frame, and an idler pulley carried by said clutch arm intermediate its respective pivotal and free ends in co-planar relationship to the aforementioned driving and driven pulleys and adapted to frictionally engage and take up slack in the drive belt to effect power-operation of the cable winding drum responsive to pivotal movement of the clutch arm in one direction, and said bed-plate being provided with mounting means for securing the bed-plate and frame upon a trailer draw-bar.

References Cited in the file of this patent

UNITED STATES PATENTS

| | | |
|---|---|---|
| 737,830 | Duryea et al. | Sept. 1, 1903 |
| 1,489,219 | Kline | Apr. 1, 1924 |
| 2,634,099 | O'Leary | Apr. 7, 1953 |
| 2,716,499 | Grant | Aug. 30, 1955 |
| 2,936,915 | Marsh | May 17, 1960 |

FOREIGN PATENTS

| | | |
|---|---|---|
| 426,430 | Great Britain | Apr. 3, 1935 |
| 696,774 | Great Britain | Sept. 9, 1953 |